(12) United States Patent
Miller

(10) Patent No.: US 8,191,199 B2
(45) Date of Patent: Jun. 5, 2012

(54) WINDSHIELD WIPER ASSEMBLY

(76) Inventor: Marsha Miller, Loveland, CO (US)

( * ) Notice: Subject to any disclaimer, the term of this patent is extended or adjusted under 35 U.S.C. 154(b) by 1177 days.

(21) Appl. No.: 11/851,735

(22) Filed: Sep. 7, 2007

(65) Prior Publication Data

US 2009/0064437 A1 Mar. 12, 2009

(51) Int. Cl.
*B60S 1/38* (2006.01)
(52) U.S. Cl. .................... 15/250.22; 15/250.41
(58) Field of Classification Search ........... 15/250.22, 15/250.23, 250.4, 250.41, 250.361, 250.11, 15/103; *B60S 1/38, 1/04, 1/28, 1/44*
See application file for complete search history.

(56) References Cited

U.S. PATENT DOCUMENTS

| | | | |
|---|---|---|---|
| 3,828,388 A | 8/1974 | Fuhr | |
| 3,892,006 A | 7/1975 | Yasumoto | |
| 4,257,138 A * | 3/1981 | Clements et al. ............ | 15/4 |
| 4,745,653 A | 5/1988 | Bliznak | |
| 5,168,595 A * | 12/1992 | Naylor, Jr. ................ | 15/250.4 |
| 5,235,720 A * | 8/1993 | Kinder ...................... | 15/250.4 |
| 5,255,407 A * | 10/1993 | Yang ......................... | 15/250.22 |
| 5,301,384 A | 4/1994 | Perry | |
| 5,323,508 A * | 6/1994 | Sheldrake .................. | 15/250.22 |
| 6,161,247 A * | 12/2000 | Breau et al. ............... | 15/250.01 |
| 6,233,779 B1 | 5/2001 | Nelson, Sr. | |
| 6,279,193 B1 | 8/2001 | Cheng | |
| 6,892,418 B2 | 5/2005 | Stouder, II | |
| 2006/0288513 A1* | 12/2006 | Rudd et al. ................. | 15/250.41 |

\* cited by examiner

*Primary Examiner* — Monica Carter
*Assistant Examiner* — Stephanie Newton
(74) *Attorney, Agent, or Firm* — Aidenbaum Schloff and Bloom PLLC; Jay Schloff

(57) ABSTRACT

Disclosed is a windshield wiper assembly capable of being mounted on an oscillating wiper mechanism of a vehicle. The windshield wiper assembly comprises a cleaning unit and a rotating mechanism. The cleaning unit comprises a wiper shaft and a plurality of cleaning implements detachably coupled to a peripheral surface of the wiper shaft. The rotating mechanism is coupled to the cleaning unit. The rotating mechanism is capable of rotating the cleaning unit in a manner such that a cleaning implement from the plurality of cleaning implements is selectively brought into contact with a windshield of the vehicle and configured to clean the windshield upon oscillating the cleaning unit over the windshield.

3 Claims, 3 Drawing Sheets

WINDSHIELD WIPER ASSEMBLY

FIELD OF THE INVENTION

The present invention generally relates to a windshield wiper assembly, and more particularly, to a wiper shaft of a windshield wiper assembly having a plurality of detachable cleaning implements capable of cleaning visibility limiting matter from a windshield of a vehicle.

BACKGROUND OF THE INVENTION

A vehicle's windshield wiper assembly is an important component of a vehicle since the windshield wiper assembly is responsible for cleaning the windshield of the vehicle for giving a clear view in front of the vehicle. Generally, the function of the wiper blade of the windshield wiper assembly becomes more important when the windshield of the vehicle is subjected to a variety of visibility limiting matters. This function becomes even more critical when the vehicle is in moving state. In a conventional windshield wiper assembly, a single wiper blade is used for wiping the visibility limiting matters (such as rain, water, snow, dust and other debris) from the windshield of the vehicle. The use of the single wiper blade for cleaning the variety of visibility limiting matters decreases the life of the wiper blade. Moreover, the quality of cleaning of the windshield also deteriorates with the use of a single wiper blade.

In recent times, many efforts have been made in the field of windshield wiper assembly for addressing the problems stated above. However, those windshield wiper assemblies have high configurational complexities and/or poor cleaning efficacy. For example, U.S. Pat. No. 5,301,384 discloses a vehicular window cleaning apparatus having a wiper arm, wiper blade and drive means therefore in combination with a scrubber for intensifying the cleaning effort of the wiper blade. The scrubber is detachably connected to the wiper blade. An adjustment means is provided for rotating the wiper blade relative to the wiper arm for selectively and sequentially positioning the wiper blade and scrubber against an associated windshield. The above prior art has configurational complexities for the purpose of cleaning the windshield and does not suggest multiple cleaning surfaces.

U.S. Pat. No. 3,892,006 discloses a rotatable wiper, substantially cylindrical in shape and adaptable for mounting on a conventional oscillating windshield wiper arm, comprising a plurality of radially-spaced, longitudinally-extending blade-pairs of resilient material formed around a flexible, heated shaft member for wiping moisture and other visibility-limiting matter from a vehicle windshield. As the wiper is drawn back and forth across the windshield by the wiper arm it is allowed to rotate freely on one pass and is locked with a blade-pair in perpendicular wiping contact with the windshield on the other, or return pass. Because of this unidirectional rotating action and the randomness with which the wiper rotates during its free-rolling pass, a substantially different blade-pair will be in wiping contact with the windshield during each locked pass. The wiper is heated by an electrical heating element located in the center of the wiper shaft and connected to an external power supply. The above patent provides for a single cleaning material used for cleaning the visibility limiting material and does not remove configurational complexities in the art.

Accordingly, what is needed is a windshield wiper assembly with reduced configurational complexities and capable of efficiently cleaning a variety of visibility limiting matter from the windshield of the vehicle.

SUMMARY OF THE INVENTION

In view of the foregoing disadvantages inherent in the prior art, the general purpose of the present invention is to provide a windshield wiper assembly configured to include all the advantages of the prior art, and to overcome the drawbacks inherent therein.

In one aspect, the present invention provides a windshield wiper assembly. The windshield wiper assembly comprises a cleaning unit and a rotating mechanism. The cleaning unit comprises a wiper shaft and a plurality of cleaning implements detachably coupled to a peripheral surface of the wiper shaft. The rotating mechanism is coupled to the cleaning unit. The rotating mechanism is capable of rotating the cleaning unit in a manner such that a cleaning implement from the plurality of cleaning implements is selectively brought into contact with a windshield of a vehicle and configured to clean the windshield upon oscillating the cleaning unit over the windshield.

In another aspect, the present invention provides a cleaning unit for a windshield wiper assembly. The cleaning unit comprises an elongated cuboidal wiper shaft and one or more elongated rectangular cleaning implements. The elongated cuboidal wiper shaft has a protruding member extending longitudinally from each peripheral face of the elongated cuboidal wiper shaft and along a complete length of the peripheral face. Each of the cleaning implement has an upper surface and a lower surface, the upper surface is coupled with a cleaning material and the lower surface has a channel extending along a complete length of the lower surface. The channel is capable of being slidably received through the protruding member of the wiper shaft and thereby detachably coupling the cleaning implement with the wiper shaft.

These together with other aspects of the present invention, along with the various features of novelty that characterize the invention, are pointed out with particularity in the claims annexed hereto and form a part of this invention. For a better understanding of the invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE INVENTION

The exemplary embodiments described herein detail for illustrative purposes are subject to many variations in structure and design. It should be emphasized, however, that the present invention is not limited to a particular windshield wiper assembly, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting.

The terms "a" and "an" herein do not denote a limitation of quantity, but rather denote the presence of at least one of the referenced item.

The present invention provides a windshield wiper assembly capable of cleaning a variety of visibility limiting matter disposed on a windshield of a vehicle. The "visibility limiting matter" as used herein refers to rain water, moisture, ice, snow, bugs, dirt and other debris which generally gets disposed on the windshield of the vehicle when the vehicle is moving or in rest. The windshield wiper assembly includes a plurality of cleaning implements detachably coupled to a wiper shaft and each cleaning implement is adapted to clean a particular visibility limiting matter. The wiper shaft is capable of rotating in a manner such that a specific cleaning implement may be selectively brought into contact with the windshield and configured to clean the visibility limiting matter upon oscillating the wiper shaft over the windshield of the vehicle.

The windshield wiper assembly of the present invention is capable of being mounted on an oscillating wiper mechanism of a vehicle such that the oscillating wiper mechanism enables the wiper shaft of the windshield wiper assembly to oscillate over the windshield of the vehicle. The windshield wiper assembly is easy to install and has substantially reduced configurational and functional complexities for the purposes of cleaning the visibility limiting matter from the windshield. The windshield wiper assembly may be mass manufactured in a cost effective manner.

Figure 1:
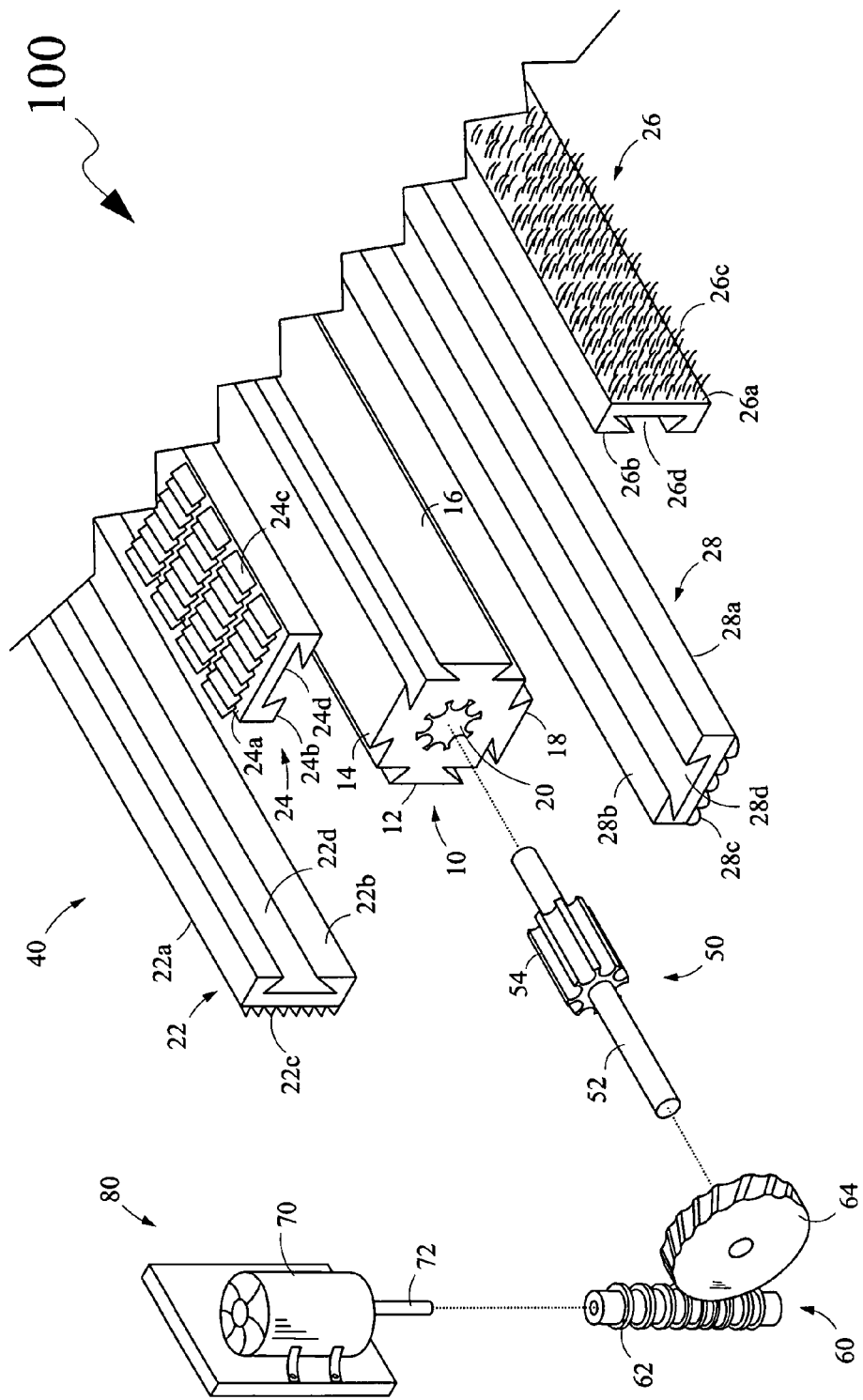
FIG. 1 is a perspective view a windshield wiper assembly 100 in an unassembled state, according to an exemplary embodiment of the present invention.
Figure 2:
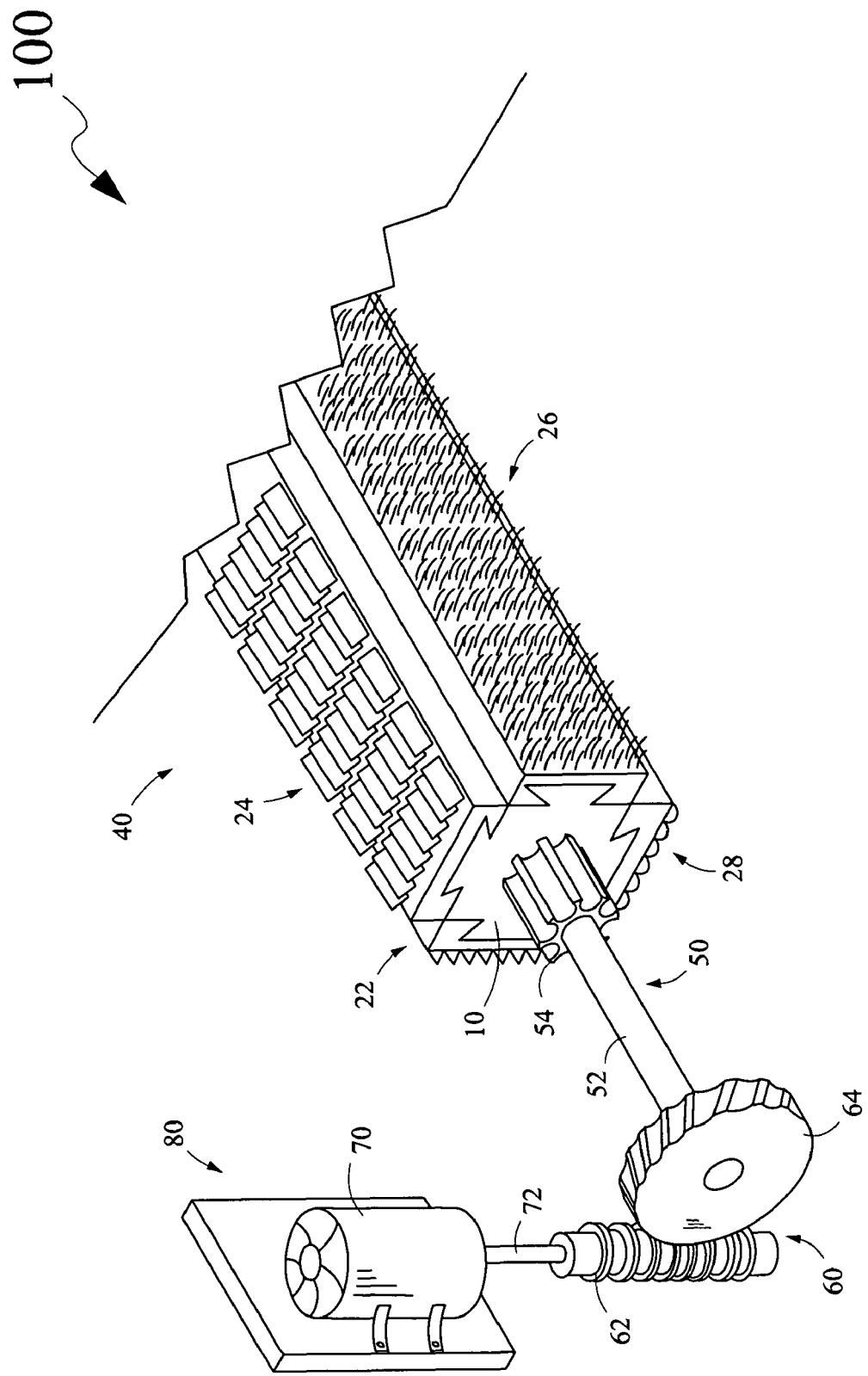
FIG. 2 is a perspective view the windshield wiper assembly 100 in an assembled state, according to an exemplary embodiment of the present invention.
Figure 3:
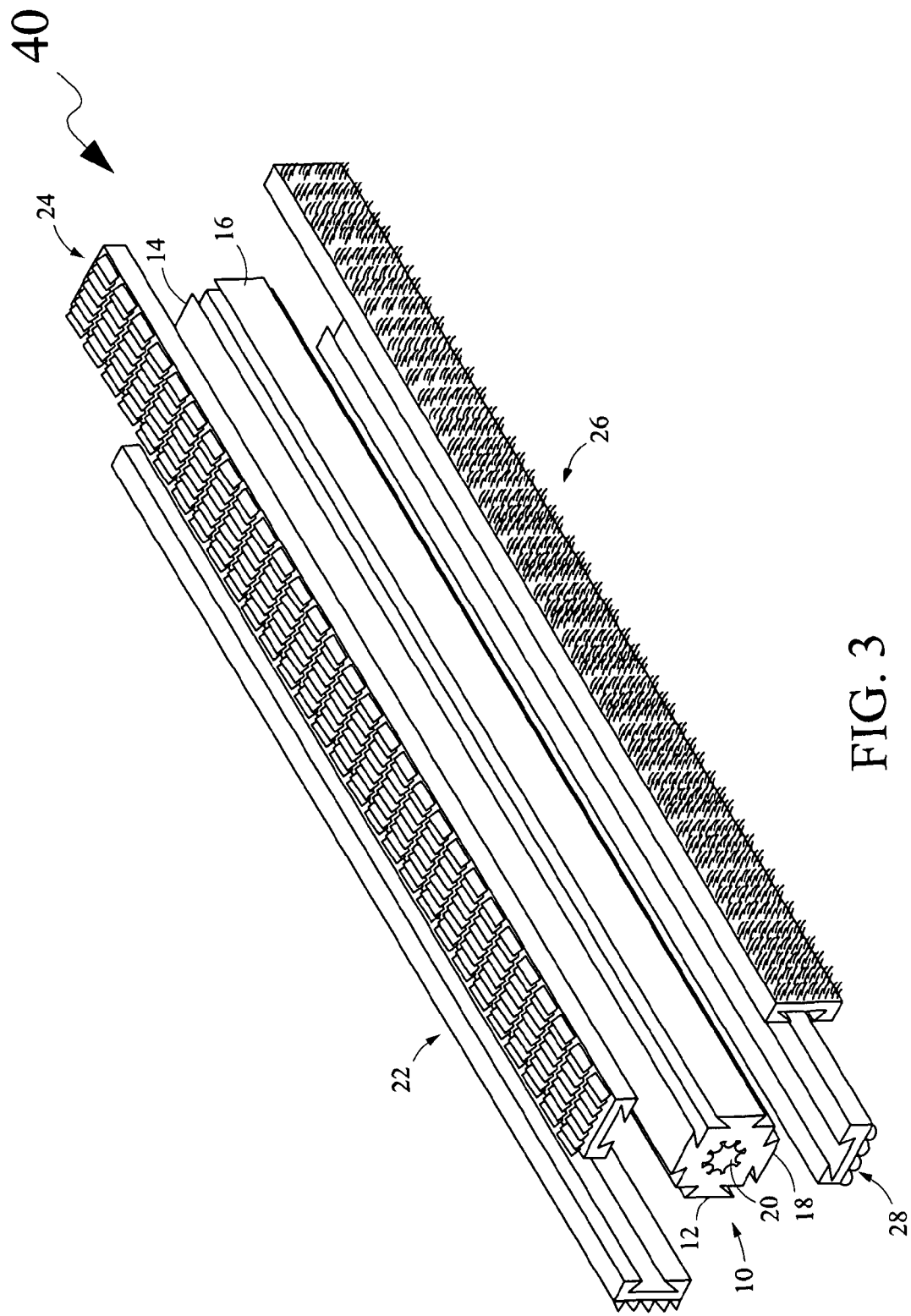
FIG. 3 is a perspective view of a cleaning unit 40, according to an exemplary embodiment of the present invention.

Referring to FIGS. 1 and 2, a windshield wiper assembly 100 of a vehicle is shown. The windshield wiper assembly 100 comprises a cleaning unit 40 and a rotating mechanism 80. The cleaning unit 40 comprises a wiper shaft 10 and a plurality of cleaning implements 22, 24, 26, and 28, see FIG. 3. The rotating mechanism 80 comprises a connector 50, a worm gear assembly 60 and a motor 70. Each of the plurality of cleaning implements 22, 24, 26, and 28 is detachably coupled to a peripheral surface of the wiper shaft 10. The wiper shaft 10 at one end is coupled to the connector 50. Further, the connector 50 operationally couples the wiper shaft 10 with the worm gear assembly 60 and the worm gear assembly 60 in turn is operationally coupled to the motor 70.

In one embodiment of the present invention, the wiper shaft 10 is an elongated cuboidal structure comprising protruding members 12, 14, 16, and 18 extending longitudinally from each peripheral face of the wiper shaft 10 and along a complete length of the peripheral face. However, it will be apparent to a person skilled in the art that the wiper shaft 10 may be configured as any elongated polygonal structure comprising a protruding members extending longitudinally from each peripheral face of the wiper shaft and along a complete length of the peripheral face. In one embodiment of the present invention, the protruding members 12, 14, 16 and 18 are isosceles trapezoidal structures and configured to receive the cleaning implements 22, 24, 26, and 28, respectively.

In one embodiment of the present invention, the cleaning implements 22, 24, 26, and 28 are a rain water blade, an ice scraper, a snow brush and a bug scrubber, respectively. The cleaning implement 22 is an elongated rectangular structure having an upper surface 22a and lower surface 22b. The upper surface 22a is coupled with a cleaning material 22c. The cleaning material 22c is capable of wiping/cleaning rain water from the windshield of the vehicle. The lower surface 22b has a channel 22d extending along a complete length of the lower surface 22b. The channel 22d is configured in a manner such that the channel 22d is capable of being slidably received through the protruding member 12 of the wiper shaft 10 and thereby detachably coupling the cleaning implement 22 with the wiper shaft 10. More specifically, the channel 22d is an elongated isosceles trapezoidal channel such that the channel 22d is capable of coupling the isosceles trapezoidal protruding member 12 of the wiper shaft 10

The cleaning implement 24 is also an elongated rectangular structure having an upper surface 24a and lower surface 24b. The upper surface 24a is coupled with a cleaning material 24c. The cleaning material 24c is capable of scraping ice from the windshield of the vehicle. The lower surface 24b has a channel 24d extending along a complete length of the lower surface 24b. The channel 24d is configured in a manner such that the channel 24d is capable of being slidably received through the protruding member 14 of the wiper shaft 10 and thereby detachably coupling the cleaning implement 24 with the wiper shaft 10. More specifically, the channel 24d is an elongated isosceles trapezoidal channel such that the channel 24d is capable of coupling the isosceles trapezoidal protruding member 14 of the wiper shaft 10.

Similarly, the cleaning implements 26 and 28 are also elongated rectangular structures having an upper surfaces 26a, 28a and lower surfaces 26b and 28b, respectively. The upper surface 26a of the cleaning implement 26 is coupled with a cleaning material 26c and the upper surface 28a of the cleaning implement 28 is coupled with a cleaning material 28c. The cleaning material 26c is capable of cleaning snow from the windshield of the vehicle and the cleaning material 28c is capable of cleaning bugs from the windshield of the vehicle. The lower surfaces 26b and 28b of the cleaning implements 26, 28 have a channel 26d, 28d extending along a complete length of the lower surface 26b and 28b. The channel 26d is configured in a manner such that the channel 26d is capable of being slidably received through the protruding member 16 of the wiper shaft 10 and thereby detachably coupling the cleaning implement 26 with the wiper shaft 10. More specifically, the channel 26d is an elongated isosceles trapezoidal channel such that the channel 26d is capable of coupling the isosceles trapezoidal protruding member 16 of the wiper shaft 10. Similarly, the channel 28d is configured in a manner such that the channel 28d is capable of being slidably received through the protruding member 18 of the wiper shaft 10 and thereby detachably coupling the cleaning implement 28 with the wiper shaft 10. More specifically, the channel 28d is an elongated isosceles trapezoidal channel such that the channel 28d is capable of coupling the isosceles trapezoidal protruding member 18 of the wiper shaft 10.

The wiper shaft 10 further includes a slot 20 configured at a lateral face of the wiper shaft 10. The slot 20 is configured in manner such that the slot 20 is capable of partially receiving and accommodating the connector 50 and thereby coupling the connector 50 with the wiper shaft 10. The connector 50 includes a shaft 52 and a gear 54 coupled to shaft 52. More specifically, the shaft 52 passes through the gear 54 in a manner such that the gear 54 is coupled to a middle portion of the shaft 52 and the shaft 52 substantially extends out of opposite lateral faces of the gear 54. Further, the connector 50 enables in operationally coupling the wiper shaft 10 with the worm gear assembly 60.

The worm gear assembly 60 includes a spirally threaded shaft 62 and a worm wheel 64. The worm gear assembly 60 operationally couples the motor 70 with the connector 50. More specifically, the spirally threaded shaft 62 is coupled to a spindle 72 of the motor 70 and the worm wheel 64 is in mesh with the spirally threaded shaft 62 and coupled to the shaft 52 of the connector 50. The worm gear assembly 60 is configured to transfer a rotational motion of the spindle 72 to the wiper shaft 10 through the connector 50, operationally coupling the worm gear assembly 60 and the wiper shaft 10.

The motor 70 in the present embodiment of the invention is a 90 degree stepper motor. The wiper shaft 10 has the cuboidal structure having four longitudinal peripheral faces coupled with four cleaning implements 22, 24, 26 and 28. A 90 degree rotation of the wiper shaft 10 enables in shifting the four longitudinal peripheral faces of the wiper shaft 10 such that the four cleaning implements 22, 24, 26, 28 are individually brought into contact with the windshield of the vehicle for every 90 degree rotation of the wiper shaft 10. It is obvious to a person skilled in the art that the type of the motor 70 is based on the configuration of the wiper shaft 10. Thus, for the present embodiment, a 90 degree stepper motor is used which enables in rotating the wiper shaft 10 in a manner such that the cleaning implements 22, 24, 26, 28 come in contact with the windshield one by one, for every 90 degree rotation provided by the spindle 72 of the motor 70. Further, a specific cleaning implement comes in contact with the windshield for a specific 90 degree rotation of the spindle 72. Additionally, the motor 70 is powered by a battery of the vehicle.

The windshield wiper assembly 100 starts operating once the power is directed to the motor 70 from the battery. Upon receiving the power, the spindle 72 of the motor 70 starts rotating and causing the spirally threaded shaft 62 to rotate. The spirally threaded shaft 62 imparts rotational motion to the worm wheel 64 in a manner such that the worm wheel 64 causes the connector 50 to rotate. The rotational motion of the connector 50 causes the wiper shaft 10 to accordingly rotate. More specifically, the rotational motion of the spindle 72 of the motor 70 is transferred to the wiper shaft 10 through the worm gear assembly 60 and the connector 50 in a manner such that a specific cleaning implement from the plurality of cleaning implements 22, 24, 26, and 28 is selectively brought into contact with the windshield. Further, oscillation of the wiper shaft 10 over the windshield enables in cleaning the windshield with the help of cleaning implements 22, 24, 26, and 28. Accordingly, the windshield wiper assembly 100 is capable of easily and efficiently cleaning the visibility limiting matter from the windshield of the vehicle.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, and to thereby enable others skilled in the art to best utilize the invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the claims of the present invention.

What is claimed is:

1. A windshield wiper assembly comprising:
    a cleaning unit comprising
        a wiper shaft, and
        a plurality of cleaning implements detachably coupled to a peripheral surface of the wiper shaft, each cleaning implement of said plurality of cleaning implements comprising a different structure than the other cleaning implements of the plurality of cleaning implements; and
    a rotating mechanism coupled to the cleaning unit,
    wherein the rotating mechanism comprises
    a motor,
    a worm gear assembly operationally coupled to the motor, and
    a connector configured to operationally couple the worm gear assembly to the wiper shaft,
    wherein the motor is capable of rotating the wiper shaft in a manner such that each cleaning implement coupled to the wiper shaft is selectively brought into contact with the windshield of the vehicle.

2. The windshield wiper assembly of claim 1, wherein the worm gear assembly comprises
    a worm wheel coupled to the connector, and
    a spirally threaded shaft meshed with the worm wheel and coupled to a spindle of the motor,
    wherein the worm gear assembly is configured to transfer a rotational motion of the spindle of the motor to the wiper shaft through the connector operationally coupling the worm gear assembly with the wiper shaft.

3. The windshield wiper assembly of claim 1, wherein the motor is a 90 degree stepper motor.

\* \* \* \* \*